McCLINTOCK YOUNG & H. J. LEBHERZ.
BRUSH MAKING MACHINE.
APPLICATION FILED JUNE 3, 1909.

982,340.

Patented Jan. 24, 1911.

McCLINTOCK YOUNG & H. J. LEBHERZ.
BRUSH MAKING MACHINE.
APPLICATION FILED JUNE 3, 1909.

982,340.

Patented Jan. 24, 1911.

WITNESSES

INVENTOR
McClintock Young
Harry J. Lebherz
BY John T. Nolan
ATTORNEY

McCLINTOCK YOUNG & H. J. LEBHERZ.
BRUSH MAKING MACHINE.
APPLICATION FILED JUNE 3, 1909.

982,340.

Patented Jan. 24, 1911.

UNITED STATES PATENT OFFICE.

McCLINTOCK YOUNG AND HARRY J. LEBHERZ, OF FREDERICK, MARYLAND, ASSIGNORS TO OX FIBRE BRUSH COMPANY, A CORPORATION OF WEST VIRGINIA.

BRUSH-MAKING MACHINE.

982,340. Specification of Letters Patent. Patented Jan. 24, 1911.

Application filed June 3, 1909. Serial No. 499,933.

*To all whom it may concern:*

Be it known that we, McCLINTOCK YOUNG and HARRY J. LEBHERZ, citizens of the United States, and residents of Frederick, in the county of Frederick and State of Maryland, have invented certain new and useful Improvements in Brush-Making Machines, of which the following is a specification.
This invention relates to machines for making brushes, and has for its object, primarily, to provide a simple and efficient construction and organization of mechanism whereby the progressive operations of boring the backs and applying the tufts thereto shall be expeditiously effected.

A further object is to provide for the efficient cleaning and trimming of the bristles after they have been applied to the backs.

In the present form of embodiment of our invention we employ a traveling conveyer by means of which the blocks, constituting the backs, are transported in a fixed path, a series of drills arranged in succeeding order, and a corresponding series of tuft inserting devices also arranged in succeeding order, said drills and devices being adapted respectively to bore the holes in the backs and insert the tufts or bristles therein, together with rotary trimming and rotary cleaning devices to which the brushes are progressively advanced by the conveyer in a manner to trim and clean the bristles.
The invention also includes various features of construction and combination of parts, all of which will be hereinafter described and claimed.

In the drawings
Fig. 2 is a partial plan thereof, the back conveyer being omitted.
Fig. 4 is a partial transverse vertical section, as on the line 4'—4' of Fig. 1.

Figure 1:
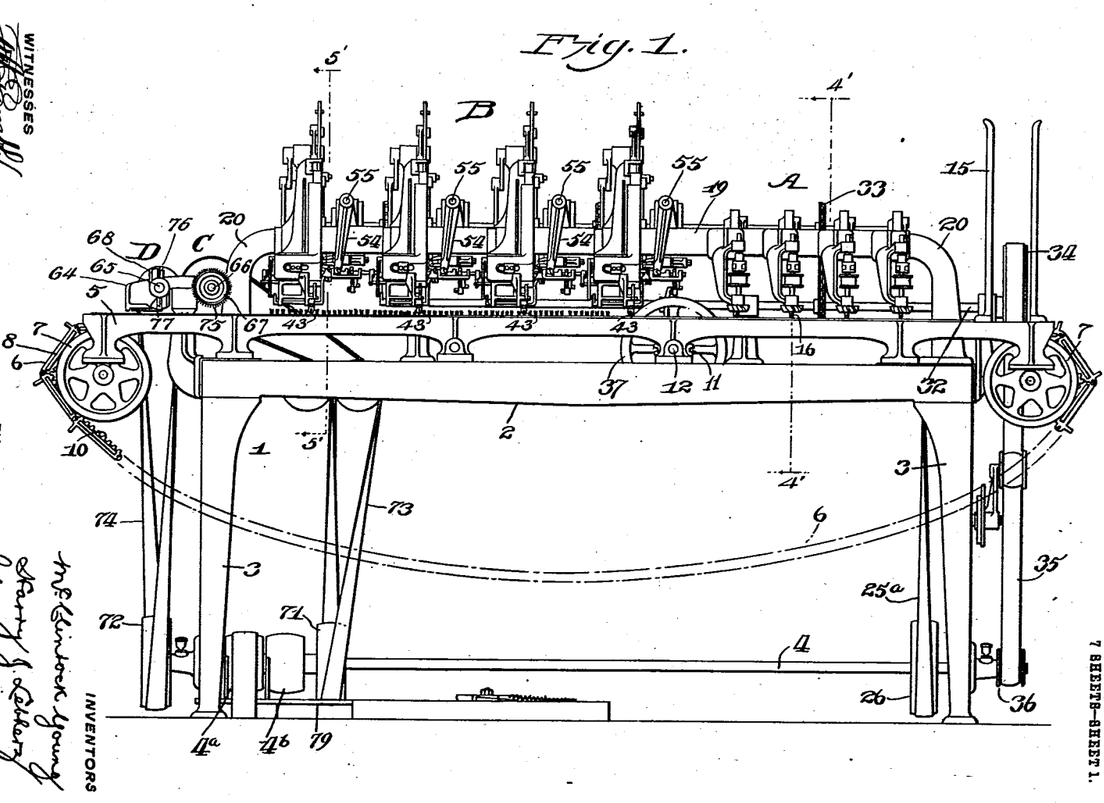
—Figure 1 is a side elevation of a brush making machine embodying a preferred form of our invention.
Figure 7:
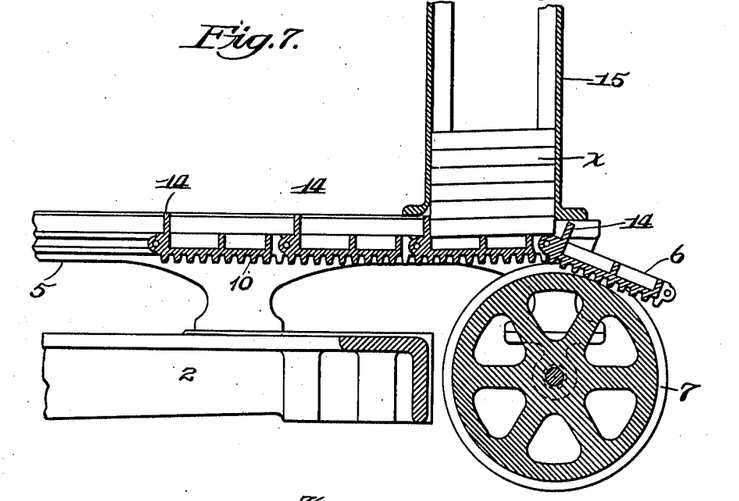
Fig. 7 is a longitudinal vertical section through the conveyer, hopper and adjuncts, at the block receiving end of the machine, showing brush blocks as being fed to the conveyer.
Figure 8:
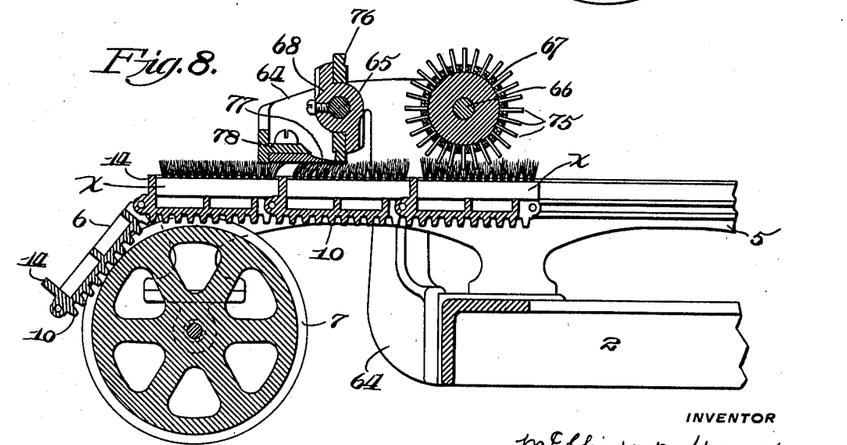
Fig. 8 is a similar section through the conveyer, the cleaning and trimming mechanisms and adjuncts, at the discharging end of the machine, showing the brushes as being acted upon by said mechanisms.
Figure 9:
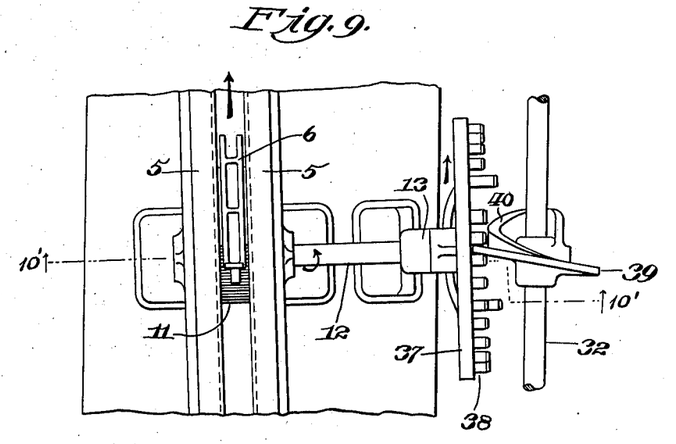
Fig. 9 is a partial plan of the actuating gearing and the runway for the conveyer.
Figure 10:
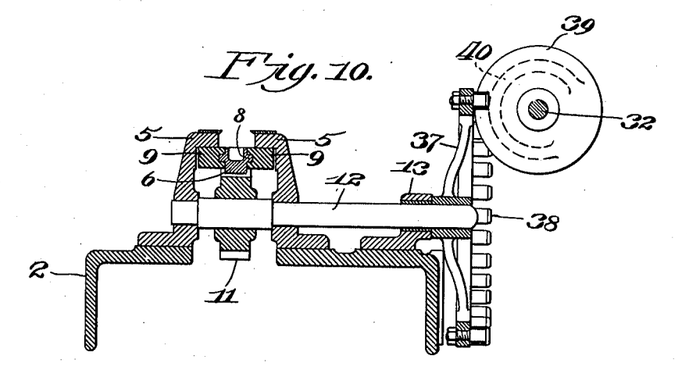
Fig. 10 is a transverse vertical section, as on the line 10'—10' of Fig. 9.

1 designates the main frame, including in its construction the bed 2 and standards 3; and 4 is the main driving shaft suitably journaled in bearings in the standards and provided with the fast and loose pulleys 4ª, 4ᵇ, respectively. Supported longitudinally upon and above the bed, and in parallelism with each other, are two bars 5, the ends of which project beyond the bed. These bars are conveniently provided with brackets or feet which are bolted to the bed, the bars being uniformly spaced or separated to afford between them a longitudinal runway for the upper horizontal stretch of a conveyer 6. This conveyer passes around suitable wheels 7 the shafts of which have their bearings in brackets or hangers depending from the ends of the bars. The conveyer in its preferred form is composed of a series of links or sections jointed together at their ends to constitute a flexible endless chain. The links are provided with laterally disposed ribs 8 and the inner sides of the bars are equipped with longitudinally grooved rails 9 with the grooves of which the ribs 8 register as the conveyer passes along the runway. Thus the upper stretch of the conveyer is effectually supported and guided in a horizontal path. The inner faces of the links are provided with gear teeth 10 with which meshes a gear wheel 11 mounted to turn within the space between the rails. This wheel is carried by a transverse shaft 12 (Figs. 1, 9 and 10), which has its bearings in two of the supporting brackets of the rails, and in a bracket 13 on the bed plate. The shaft is given a variable intermittent motion, as hereinafter described, in a manner to effect a corresponding advancement of the conveyer. The links are provided at their forward or leading ends with outwardly projecting lugs 14 which constitute in effect jaws, the distance whereof between adjoining links corresponds with the length of a brush back or block (x) or substantially so. At one end of the runway is a vertical hopper 15 within which the selected brush backs or blocks are piled, one upon another, the lowermost back resting upon the conveyer between the jaws of adjoining links. (See Fig. 7.) At this point the jaws are open or divergent by reason of the flexing of the links while they are passing around the proximate guide wheel, but as the links assume a horizontal path the jaws are brought into parallelism with each other and thus caused to grasp the interposed back and carry it onward with the conveyer. Another back is then delivered by the hopper to the succeeding link of the conveyer, and so on in continuous succession. The backs are thus carried in endwise procession through the runway.

During the travel of the backs or blocks they are presented to drilling mechanism A by means of which transverse rows of vertical holes are drilled in their upper surfaces, and then to tuft-selecting and inserting mechanism B by means of which tufts of fiber are selected and inserted into respective holes.

Referring to the drilling mechanism—16 represents a series of vertical drills corresponding in number with the holes in a transverse row. In the present instance, there are four holes in a row, and hence four drills are provided. These drills are mounted and arranged in succeeding order to act in different vertical planes corresponding with those of a row of holes to be formed in the brush back, whereby, as the backs are intermittently advanced beneath the drills, the first drill acts to form the first or end holes of the consecutive rows, the next the second holes thereof, the next the third holes, and the next the fourth or end holes. Thus when each back has passed the fourth drill, the back has its full quota of holes for the reception of the tufts of fiber.

Figure 14:
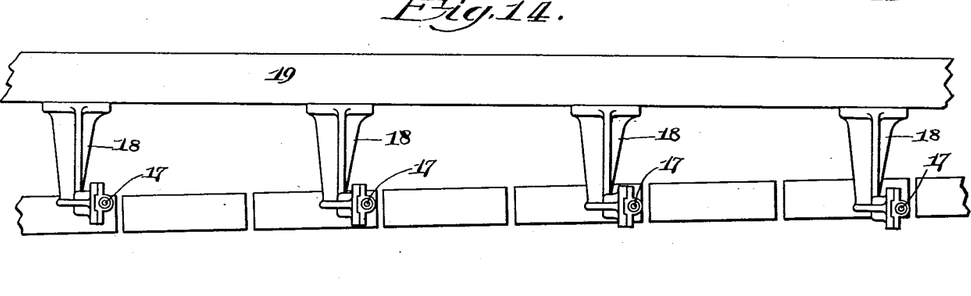
Fig. 14 is a view, similar to Fig. 10, of a modification wherein the drills are disposed in line with each other.

While the distance horizontally between the vertical planes of succeeding drills may be equal to the space between the centers of adjacent holes of a row, and the backs be fed in a straight path below the same, yet we prefer to reduce the extent of horizontal projection of the succeeding drills and compensate for the reduction by feeding the backs at a slight angle in respect to the vertical paths of the drills, as illustrated. This coöperative relation of the succeeding drills to the travel of the backs may also be secured by disposing the drills in alinement with each other, and by feeding the backs at a proper angle thereto, as indicated in Fig. 14.

The drill devices herein selected to illustrate our invention are, aside from their peculiar mounting in multiple, generally of the character shown and described in Letters Patent of the United States, No. 578,907, dated March 16, 1897. They may be briefly described as follows:—

Figure 3:
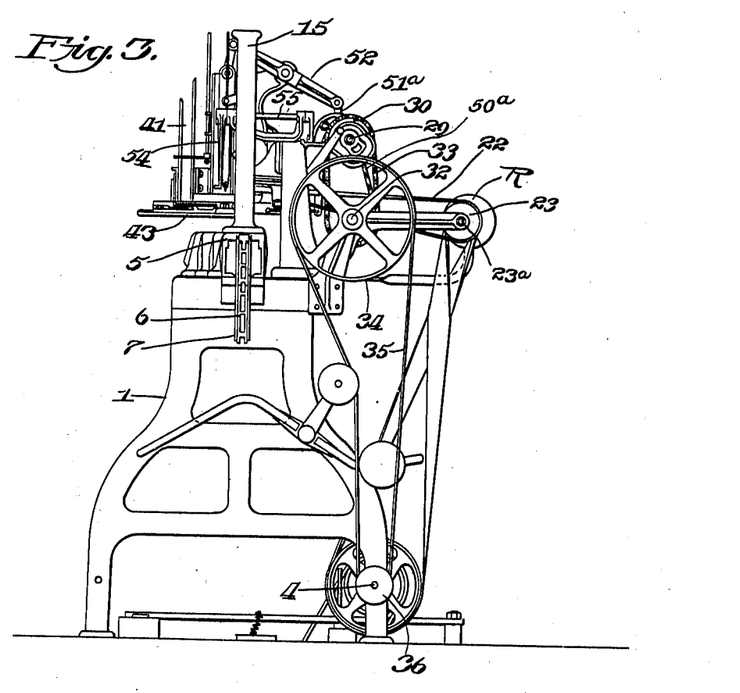
Fig. 3 is an end elevation.
Figures 4, 6:
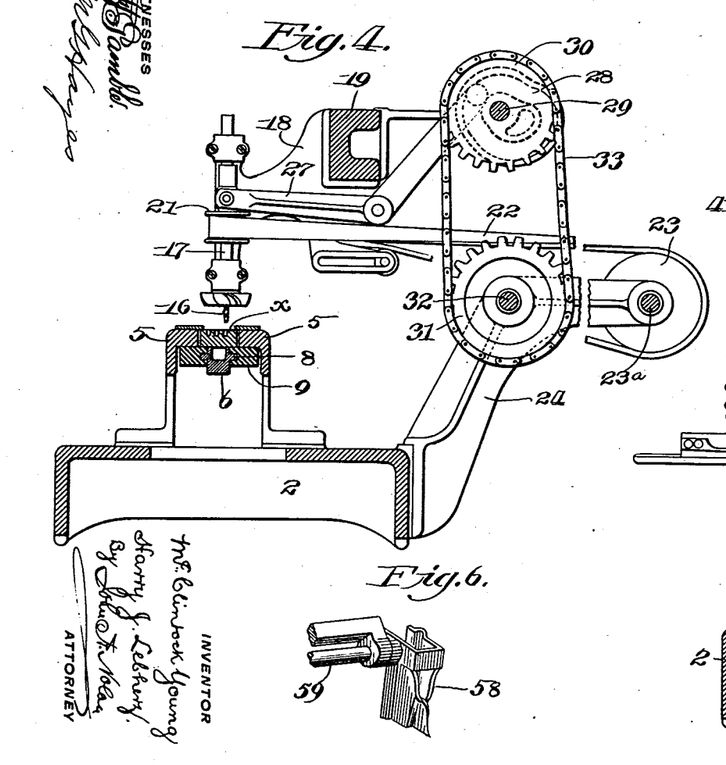
Figure 5:
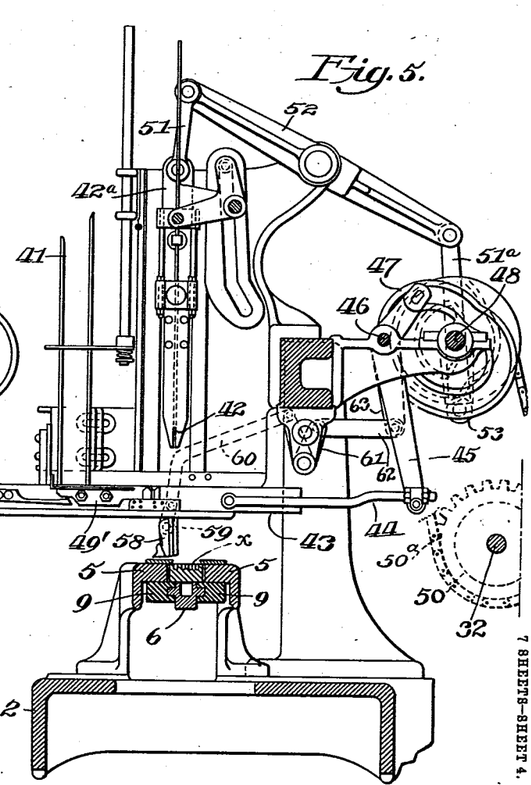
Fig. 5 is a similar section, as on the line 5'—5', of Fig. 1, a part of the sprocket gearing on the supplemental drive shaft being indicated by dotted lines.
Figure 6:
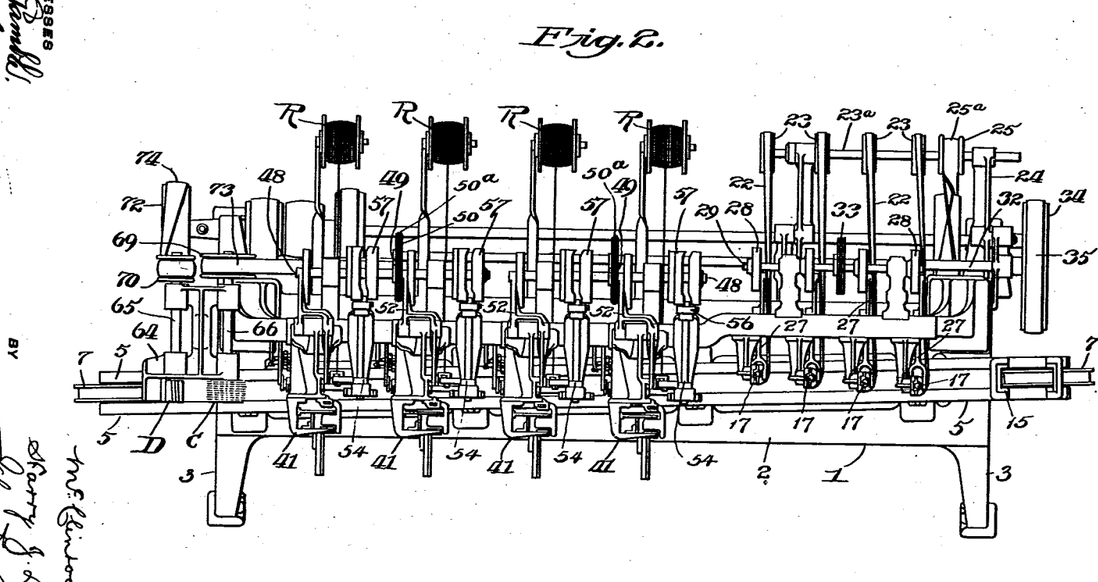
Fig. 6 is a detail, in perspective, of the oscillatory tuft guide and its shaft.

The drill spindles 17 are journaled in heads carried by brackets 18 affixed to a frame bar 19 supported by end posts 20 rising from the bed. Each of the spindles is provided with a pulley 21 which is connected by a belt 22 with a pulley 23 on a horizontal shaft $23^a$ having its bearings in rearwardly extending brackets 24 on the main frame. This shaft is provided with a pulley 25 which is connected with a pulley 26 on the main shaft by means of a driving belt $25^a$. (See Figs. 1, 3 and 4.) Thus the series of drills are simultaneously driven. Each of the spindles is encircled by a collar which is connected with one arm of a rock lever 27, the other arm of which is provided with a roller in engagement with a face cam 28 on a driven shaft 29, whereby the spindle and its drill are lowered and raised at the commencement and completion, respectively, of each drilling operation.

The shaft 29 is provided with a sprocket wheel 30 which is geared with and driven by a corresponding sprocket wheel 31 on a supplemental drive shaft 32 by means of a chain 33. This supplemental shaft is provided with a pulley 34 which is connected by means of a belt 35 with a pulley 36 on the main drive shaft.

Figure 11:
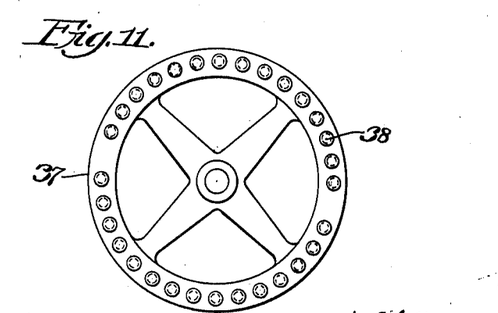
Fig. 11 is a face view of the pin wheel element of the conveyer actuating gearing.
Figure 12:
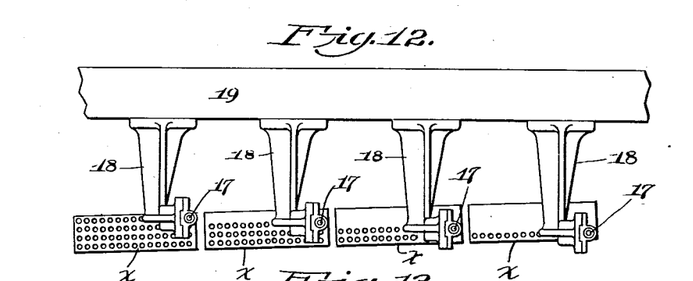
Fig. 12 is a partial plan of the series of drills, showing their relation to each other and to the path of the brush blocks.

The endless conveyer 6 is advanced with a series of uniform intermittent movements corresponding with the numbers of rows of holes to be formed in the brush back, and at the end of each series the conveyer is given a movement of somewhat greater extent in order to compensate for the spaces between the ends of adjoining backs on the conveyer. During each dwell of the conveyer, the drills are lowered to bore the holes therein and then raised preparatory to a succeeding operation. While any suitable mechanism may be employed to impart the required intermittent movements to the conveyer, we prefer to employ cam and pin wheel devices of the character shown in Figs. 9, 10 and 11, as follows:—Affixed to the outer end of the transverse shaft 12, is a wheel 37 provided on its outer face with two series of pins 38, each series corresponding in number with the rows of holes to be formed in the brush back. The pins are uniformly spaced apart, excepting the first and final pins of the respective series, the distance between which represents the long space movements to be effected between the ends of adjacent backs. Mounted on the shaft 32 is a worm or cam having two acting surfaces 39, 40, the former of which projects beyond and is of less pitch than the other, whereby in the rotation of the cam its surface 39 engages the short pins successively and imparts the series of uniform intermittent movements to the wheel, and upon the completion of such series of movements the surface 40 engages the long pin and imparts the extended or long space movement to the wheel. This being done, the cam surface 39 reëngages the short pins and the uniform feeding operation is repeated, and so on.

Referring to the tuft-selecting and inserting mechanism,—41 represents a series of fiber-containing hoppers supported at intervals along the bed; 42 a corresponding series of tuft inserting devices; and 43 a corresponding series of reciprocating tuft-selecting slides which in their operation select tufts of fiber from the respective hoppers and transfer them to and beneath the respective drivers for insertion thereby into the previously bored holes of the underlying brush backs.

Figure 13:
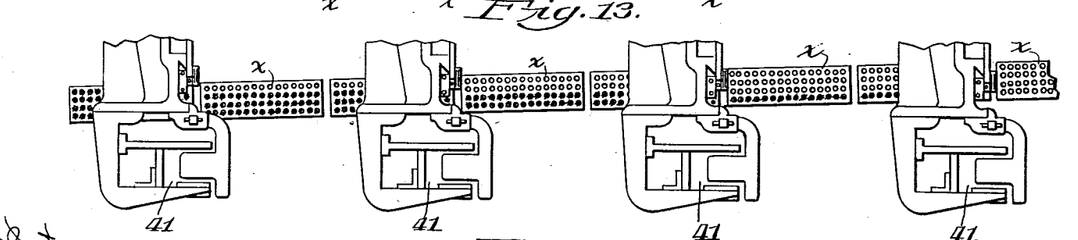
Fig. 13 is a similar plan of the series of tuft inserting devices.

The tuft inserting devices include the drivers 42 arranged at different points above and along the trackway, and in the same relative position to the path of the backs as the drills, to the end that as the bored backs are intermittently moved beneath the drivers, the first driver acts to insert tufts successively into the first or end holes of the consecutive rows; the next driver to insert tufts into the second holes; the next into the third holes, and the next into the fourth or end holes. Hence when each back has passed the fourth or final driver all the holes of the back are fully supplied with tufts of fiber. (See Fig. 13.)

The tuft-selecting and inserting devices herein selected to illustrate our invention, are, aside from their peculiar mounting in multiple, generally of the character shown and described in Patent No. 578,907, hereinbefore referred to. Briefly described, each of the slides 43 is connected by means of a link 44 with the lower arm of a lever 45 carried by a rock shaft 46 the upper arm of which lever is provided with a block or roller in engagement with a cam 47 on a driven shaft 48, whereby the slide is periodically reciprocated to move the notched fiber-receiving portion of the slide under the magazine for a supply of fiber, and then beneath the fiber-guiding and seating devices to transfer the fiber to a position below the latter. The shaft 48, similarly to the shaft 29, is provided with sprocket wheels 49, which are connected with sprocket wheels 50 on the shaft 32 by means of chains 50ª.

The slide 43 bears on its side a relatively-movable plate 49' which during the reciprocation of the slide is actuated periodically to open and close the fiber-receiving notch of the slide.

The vertically-reciprocating driver 42 in its descent engages the opposing wisp of fiber and forcibly inserts it into the underlying hole in the brush back. The driver is carried by a slide 42ª which is connected by means of a link 51 to one arm of a lever 52 the other arm of which is joined by means of a link 51ª with a crank arm 53 on the shaft 48 and thereby vertically reciprocated. The driver not only inserts the tuft or wisp of fiber into the hole in the brush back but also seats and drives into the back the wire staple for fastening the tuft. The wire from which the staples are formed, is fed as usual from a suitable reel R to clamping and cutting devices adjacent the driver, the clamping devices carrying the severed wire for the staple and being periodically moved beneath the driver by a vibrating lever 54. This lever is mounted on the outer end of a rock shaft 55 having its bearings in a bracket on the bar 19, the inner end of the shaft having a crank 56 which enters a cam 57 on the shaft 48, substantially as set out in the Patent No. 578,907 aforesaid. Separate wire reels R are provided for the inserting devices, and these reels are conveniently mounted on suitable supporting bars projecting rearwardly from the main frame. Instead of the sliding member shown and described in said patent for aiding in forming the tuft and guiding it to the brush back, we preferably though not essentially employ the oscillatory member herein illustrated, the same comprising a longitudinally channeled head 58 affixed to one end of a horizontal rock shaft 59 and thereby movable into and from the vertical path of the driver 42. The other end of the shaft 59 is connected by means of an arm 60 with one of the arms of a crank lever 61, the other arm of which is connected by means of a link 62 with a lever arm 63 on the rock shaft 46 whereby during the descent of the driver the guide head is maintained in a vertical position to receive the same, and then upon the insertion of the tuft is swung laterally to escape the tuft and permit the unobstructed advance of the brush back. In the present instance two shafts 48, are employed, each carrying the cams and crank arms for two of the tuft selecting and inserting mechanisms. If desired, a single shaft may be used.

When the brushes leave the tuft inserting mechanism, and before they are discharged from the conveyer, they are advanced under and are subjected to the successive actions of cleaning and trimming mechanisms, C, D, respectively, which are preferably of the following description:

64 is a bracket affixed to the main frame at or adjacent the discharging end of the runway. Journaled in suitable bearings in this bracket are two parallel shafts, 65, 66, the inner ends of which overhang the runway and bear a cleaning wheel 67 and a cutter head 68, respectively. The opposite ends of these shafts are equipped with pulleys 69, 70, which are connected with and driven from pulleys 71, 72, on the main drive shaft by means of belts 73, 74, respectively. The cleaning wheel is peripherally studded with wires or pins 75 which rapidly rotate in the path of the upwardly-projecting tufts or fibers of the underlying brushes and thereby thoroughly beat out and remove the free or loose fibers.

The cutter head is provided with radial cutter blades 76 which are arranged to co-act with a relatively fixed cutter blade 77 in the path of the free ends of the fibers, and thereby efficiently trim off the irregular ends to insure a uniform fibrous surface for the brush. The blade 77 is affixed by screws or other means to an overhanging bar 78 projecting from the bracket 64.

When the conveyer passes around the sprocket wheel at the discharging end of the machine, the jaws 14 of the conveyer links open or diverge to permit the finished brushes to fall therefrom into a suitable receptacle.

While we have herein shown and described a simple and efficient form of embodiment of our invention, it is to be understood that we do not limit ourselves thereto, as the mechanism may be modified in many respects without departing from the fair spirit of the invention.

We claim—

1. The combination with a series of tuft-inserting devices arranged in succeeding order and corresponding in number with each transverse row of tufts to be applied to a brush back, of means for feeding backs progressively to said devices.

2. The combination with a series of tuft-inserting devices arranged in succeeding order and corresponding in number with each transverse row of tufts to be applied to a brush back, of means for feeding backs in end to end procession in a diagonal path with respect to the said devices.

3. The combination with a series of drills arranged in succeeding order, and a corresponding series of tuft-inserting devices arranged in succeeding order, of means for feeding backs progressively to said drills and inserting devices.

4. The combination with a series of drills arranged in succeeding order, and a corresponding series of tuft-inserting devices arranged in succeeding order, of means for feeding backs in end to end procession in a diagonal path with respect to said drills and inserting devices.

5. The combination with a series of tuft-inserting devices arranged in succeeding order, of an endless conveyer for brush backs, and means for actuating said conveyer to advance the backs progressively to the inserting devices.

6. The combination with a series of drills arranged in succeeding order, and a corresponding series of inserting devices arranged in succeeding order, of an endless conveyer for brush backs, and means for actuating said conveyer to advance the backs progressively first to the said drills and then to the said inserting devices.

7. In a machine for making brushes, a back conveyer comprising jointed links having means for holding brush blocks thereon, supporting wheels for the conveyer, a guideway within which travels the upper run of the conveyer, and means for actuating said conveyer.

8. In a machine for making brushes, the combination with boring devices, tuft-inserting devices, cleaning devices, and trimming devices, of means for feeding brush backs progressively to and across the paths of the respective devices.

Signed at Frederick in the county of Frederick and State of Maryland this 29 day of May, 1909.

McCLINTOCK YOUNG.
HARRY J. LEBHERZ.

Witnesses:
ALFRED McEWEN,
GEORGE CLIFFORD DOLL.